United States Patent [19]

Marshall et al.

[11] 4,254,998
[45] Mar. 10, 1981

[54] TRAILER SWAY-CONTROL AND BRAKING SYSTEM

[75] Inventors: John J. Marshall, Grand Rapids, Mich.; James M. Kilchenman, North Webster, Ind.

[73] Assignee: Epco Mobilehome Products, Inc., Marshall, Mich.

[21] Appl. No.: 955,942

[22] Filed: Oct. 30, 1978

[51] Int. Cl.³ .............................................. B60T 13/06
[52] U.S. Cl. ................................. 303/20; 188/112 A; 200/61.52; 303/7; 303/92
[58] Field of Search ........................ 303/7, 20, 3, 24 B, 303/24 BB; 188/112 A, 112 R; 180/282; 280/432, DIG. 14; 200/61.47, 61.44, 61.52; 116/227; 73/291, 649, 652; 340/52 R, 65; 307/129, 117, 121, 218; 328/94; 192/9, 4 R, 4 A

[56] References Cited
U.S. PATENT DOCUMENTS

| | | | |
|---|---|---|---|
| 1,774,337 | 8/1930 | Sichel | 200/61.52 |
| 3,259,202 | 7/1966 | Griffeth | 200/61.52 X |
| 3,746,132 | 7/1973 | Jewell, Jr. | 303/7 X |
| 3,758,165 | 9/1973 | Savelli | 303/20 |
| 3,861,489 | 1/1975 | Lang et al. | 303/20 X |
| 3,944,288 | 3/1976 | Bertolasi | 303/92 |
| 3,951,464 | 4/1976 | Donahue et al. | 303/7 |
| 4,023,863 | 5/1977 | Sisson et al. | 188/112 A X |
| 4,140,352 | 2/1979 | Delpech et al. | 303/20 X |

Primary Examiner—J. D. Miller
Assistant Examiner—Reinhard J. Eisenzopf
Attorney, Agent, or Firm—Gust, Irish, Jeffers & Hoffman

[57] ABSTRACT

Apparatus for inhibiting sway and for applying the brakes of a trailer includes a sway sensor connected to a frequency-discriminating circuit which senses lateral oscillatory motion of the trailer and which generates separate right and left acceleration signals in response to right and left acceleration, respectively, of the trailer. A circuit produces a sway-inhibiting signal in response to both of said right and left acceleration signals which successively occur in a time shorter than a predetermined period of time. A braking-signal circuit produces a brake control signal in response to the sway-inhibiting signal, this brake control signal being utilized for applying the trailer brakes momentarily to correct for a sway condition.

23 Claims, 9 Drawing Figures

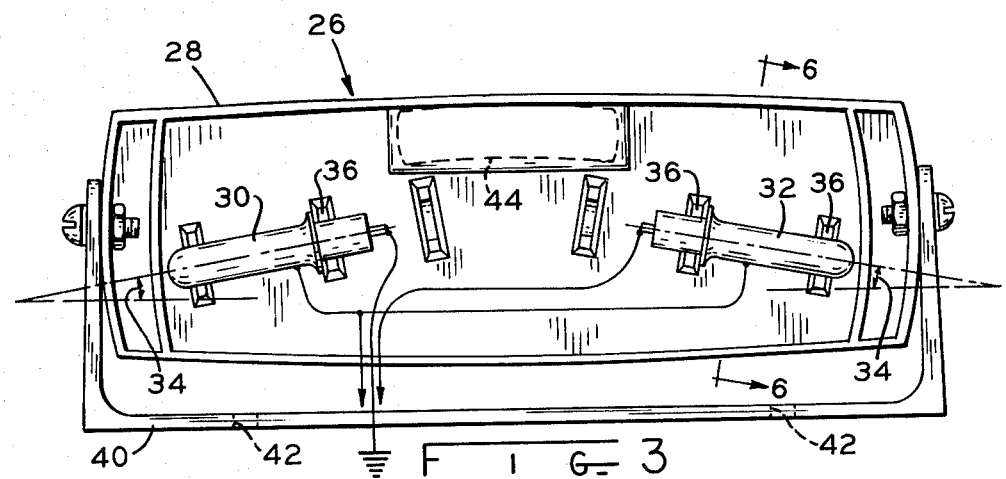
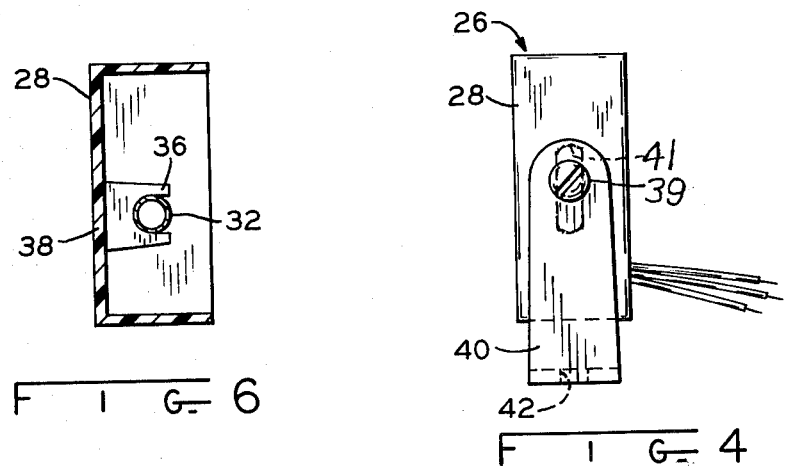
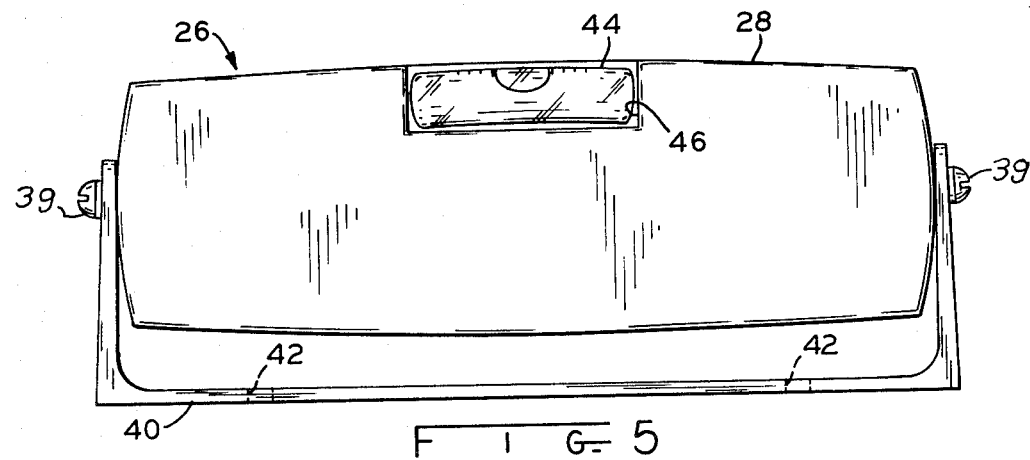

4,254,998

TRAILER SWAY-CONTROL AND BRAKING SYSTEM

BACKGROUND OF THE INVENTION

1. Field of the Invention

The present invention relates to braking systems for trailers and more particularly to systems for controlling sway and for applying the trailer brakes.

2. Description of the Prior Art

Trailers, such as mobile homes, travel trailers, campers and the like, are conventionally equipped with electrically actuable brakes which may be operated by the driver in the towing automobile. During travel in excess of predetermined speeds the hazardous condition of trailer sway may occur and this is inhibited by momentary application of the trailer brakes. Such momentary application results from briefly energizing the brake-actuating coils by means of manually or automatically operable devices. Typical of such devices are those disclosed in U.S. Pat. Nos. 3,840,276; 3,861,489; 3,758,165; 3,288,240; 3,819,234; 3,908,782; 3,895,683; 3,243,192 and 4,023,864.

A "sway" condition is typified by the trailer rapidly swinging from side to side as opposed to moving to one side or swerving as in rounding a curve. As is well known, such sway is inherently hazardous and can be the cause of an accident.

Many prior art systems have been employed to minimize or eliminate sway. Some of the mechanical and electrical apparatuses heretofore used suffer the disadvantage of not only functioning to correct the sway but also to apply braking resistance during rounding a turn or curve.

It is desirable at times to apply the trailer brakes without applying the brakes of the towing vehicle. Many of the prior art sway control systems have no such capability. Others utilize electro-mechanical devices which lack reliability and facile control of brake application.

SUMMARY OF THE INVENTION

Apparatus of this invention serves to control trailer sway and also provides means for independently applying the trailer brakes. The apparatus includes a sway sensor coupled to a frequency-discriminating circuit and which senses lateral oscillatory motion of the trailer, generating separate right and left acceleration signals in response to right and left acceleration, respectively, of the trailer. The frequency-discriminating circuit produces a sway-inhibiting signal in response to both of the right and left acceleration signals when they occur successively in a time shorter than a predetermined period of time. A control signal circuit produces a brake control signal in response to the sway-inhibiting signal, the brake control signal being utilized for the purpose of applying momentarily the trailer brakes to correct the sway condition.

The frequency-discriminating circuit includes two signal-generating circuits responsive to said right and left acceleration signals to produce two logic signals respectively, these being combined to produce a single sway-inhibiting signal only when the two logic signals occur simultaneously.

A brake applying circuit is provided which may be operated from the towing vehicle for applying the trailer brakes. This brake applying circuit employs two manually operable, brake-actuating devices, one being a tow-vehicle brake pedal and the other a hand operated push bar. A brake-signal producing circuit generates a braking signal in response to operation of either of the devices, this signal being applied to the aforesaid control signal circuit of the sway control apparatus. Thus, common circuitry is employed in both the sway control and brake applying circuits.

Protection against overload in the trailer-braking circuits is provided in the form of a sensing device responsive to an overload which produces a signal for disabling the control signal circuit. Thus, should a short circuit develop in the trailer brake circuit, the control signal circuit will be disabled thereby avoiding damage to circuit components.

It is an object of this invention to provide an electronic sway control apparatus which responds only to a true sway condition and not to a swerve as is encountered in rounding a curve and/or some other non-sway motion.

It is another object to provide a combination sway and brake controlling apparatus which utilizes common electronic circuitry and which functions to provide sway control during less than full application of the brakes.

It is another object of this invention to provide an apparatus for selectively applying the brakes of a trailer from the towing vehicle, which is simple, economical and reliable in operation.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 3 is a rear view of a sway sensor employing two angularly related mercury switches;

FIG. 4 is an end view thereof;

FIG. 5 is a front view;

FIG. 6 is a sectional view taken substantially along section line 6—6 of FIG. 3;

DESCRIPTION OF THE PREFERRED EMBODIMENT

Figure 7:
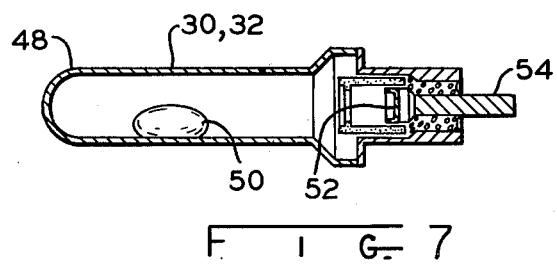
FIG. 7 is a longitudinal sectional view of one of the mercury switches used in the sensor of FIGS. 3 through 6.
Figure 8:
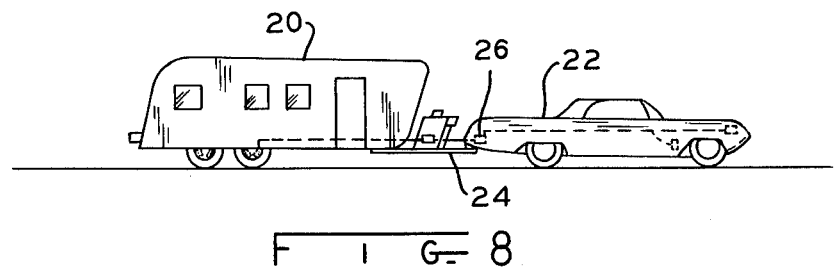
FIG. 8 is a side view of a typical trailer connected to an automobile in a towing configuration.

Referring first to FIG. 8, a trailer 20 is connected to a towing automobile 22 by means of a conventional hitch 24. Mounted on the rear of the towing vehicle, for example inside the trunk, is a sway sensor generally indicated by the numeral 26. This sway sensor 26 is shown in more detail in FIGS. 3 through 7 and includes a substantially rectangular plastic housing 28 having two conventional mercury switches 30 and 32 mounted therein, these switches being set an angle of about 10° with the horizontal as indicated by the angle 34. The angle 34 is formed between the longitudinal axis of each of the switches 30 and 32 and the horizontal when the sensor 26 is properly positioned within the trunk of the automobile 22 as will be later explained. It will become apparent from the following description that the angle 34 may be varied slightly to alter the sway-sensing operation thereof, but for the purposes of further explanation of this invention, the angle of 10° may be assumed.

Each of the mercury switches 30 and 32 is nested in two spaced apart, plastic U-shaped supports 36 which upstand from the wall 38 of the housing 28 as shown. Each switch 30, 32 is physically secured within the respective U-shaped supports 36 by means of glue or a suitable clamp (not shown). In any event, the switches 30 and 32 are rigidly secured within the housing 28.

Secured to the ends of the housing 28 by means of screws 39 is a mounting bracket 40 provided with mounting holes 42 for receiving fasteners which may be threaded into the floor of the automobile trunk or some suitable rigid support within the trunk. A leveling bubble 44 is disposed within a recess 46 in the housing 28 as shown and is there secured again by means of a suitable glue or clamping bracket (not shown).

The sensor 26 is mounted in the trunk of the automobile 22 in such position that the longitudinal axis of the housing 28 is at right angles to the longitudinal axis of the automobile. In mounting the bracket 40 to the floor of the trunk, screws 39 are adjusted in the elongated holes 41 in the ends of housing 28, assuming that the automobile is situated on a horizontal surface, such that the leveling bubble 44 indicates a truly horizontal position. In this position, the two mercury switches 30 and 32 are set at the angles 34 with the horizontal and will respond to like transverse motions of the rear of the automobile as may be induced by sway of the trailer 20.

FIG. 7 illustrates a suitable design for the mercury switches 30, 32, a metallic housing 48 containing a mercury pool 50 and carrying a contact 52 having a connecting terminal 54. This particular switch is manufactured by Durakool, Inc. of Elkhart, Indiana, and is otherwise identified as the G-5 Nude Assembly.

Figure 1:
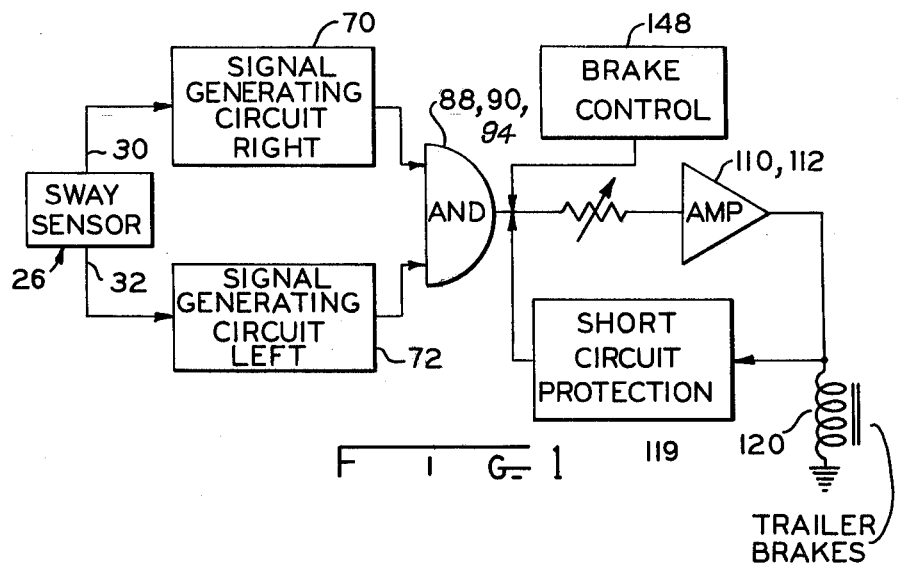
FIG. 1 is a block diagram of one embodiment of this invention.
Figure 2A:
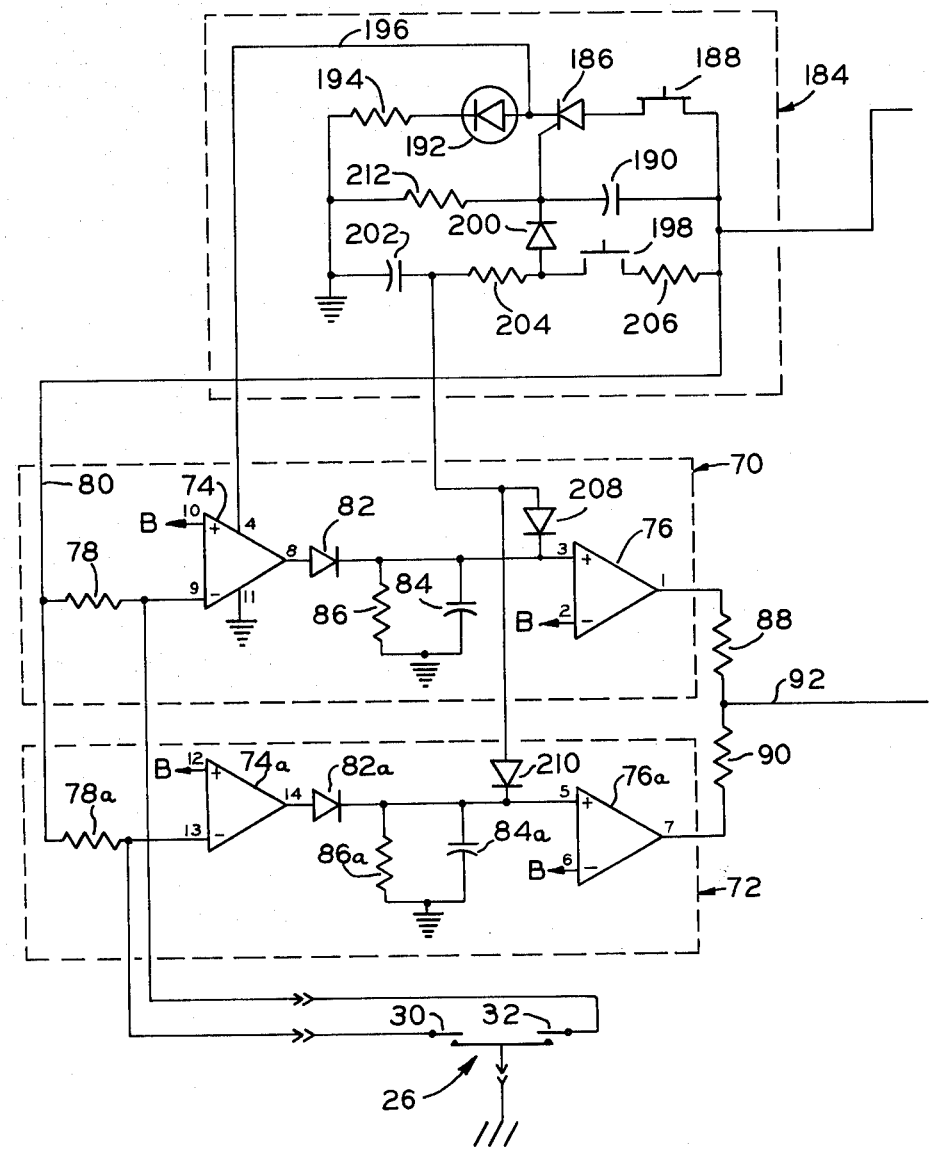
FIGS. 2A and 2B is a schematic diagram thereof.
Figure 2B:
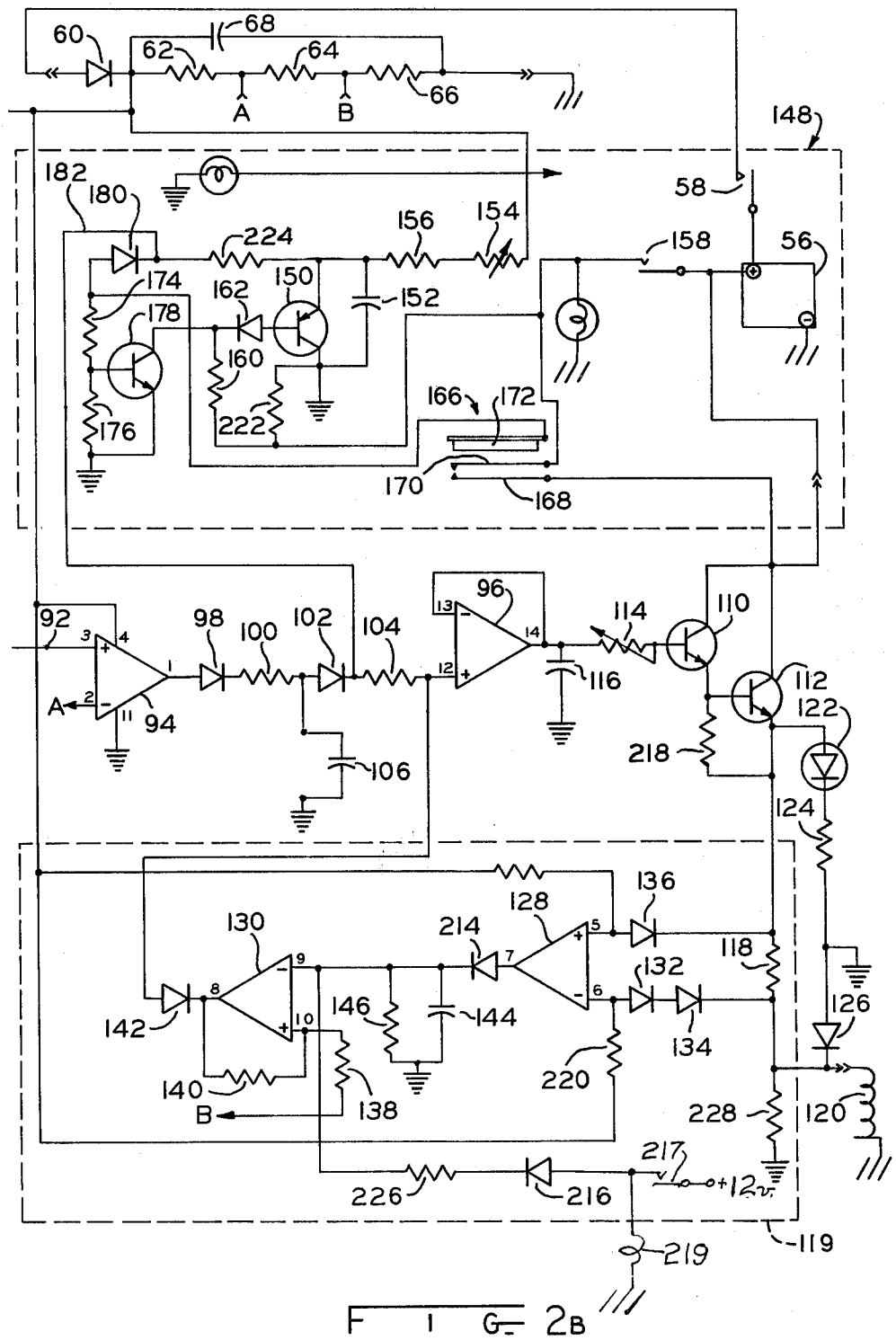

Referring now to FIGS. 1 and 2, like numerals will indicate like parts. The sensor 26 is shown diagrammatically, with the switches 30 and 32 thereof being indicated as normally open. A twelve volt battery 56 and alternator (not shown) conventionally mounted in the automobile supplies the power necessary for the operation of the remaining circuitry. The power supply circuitry includes the ignition switch 58, a diode 60 and three resistors 62, 64 and 66 all series connected with the battery 56. The values of these components are so selected, in an operating embodiment of this invention, to provide essentially twelve volts at the cathode of the diode 60, eight volts at the juncture "A" of the two resistors 62 and 64, and four volts at the juncture "B" of the two resistors 64 and 66. A capacitor 68 is connected across the three resistors as shown to reduce the ripple present in the automotive electrical system and the diode 60 serves to protect against negative polarity voltage transients in the ignition system from damaging the remaining circuitry.

The sensor 26, and more particularly the two switches 30 and 32, is connected to two signal-generating circuits 70 and 72. Since the circuits 70 and 72 are identical, a description of one will suffice for both. Referring to the circuit 70, it includes two operational amplifiers 74 and 76. The inverting terminal of amplifier 74 is connected by means of a resistor 78 to the twelve volt supply line 80. This same inverting terminal is connected to switch 32 as shown. The non-inverting terminal is connected to the source "B" of threshold voltage.

The output terminal of amplifier 74 is connected to the non-inverting terminal of the amplifier 76 by means of a diode 82. A timing capacitor 84 is connected between this non-inverting terminal and ground, a resistor 86 being connected in parallel with the capacitor 84.

The signal-generating circuit 72 is identically constructed, like numerals with the suffix "a" indicating identical components. It is to be understood, of course, that the operational amplifiers are individual components of a single integrated circuit, the indicated operational amplifiers being components thereof. The terminals or pins of these amplifiers are denoted by numbers which correspond to those of the type of integrated circuit specifically noted at the end hereof.

The output terminals of the two amplifiers 76 and 76a are connected together by means of two series connected resistors 88 and 90 of preferably the same value. A common output line 92 connects to the juncture of the two resistors 88 and 90. This output line 92 is connected to the non-inverting terminal of another operational amplifier 94, the inverting terminal being connected to tap "A" in the voltage dividing circuit 62, 64, 66, tap "A" providing approximately an eight volt threshold voltage.

Another operational amplifier 96, connected as a voltage follower, has its non-inverting terminal connected to the output terminal of the amplifier 94 by means of two diodes and two resistors 98, 100, 102 and 104 connected in series. Connected between the anode of diode 102 and ground is a timing capacitor 106.

A Darlington pair, current amplifier having transistors 110, 112 are connected to the output terminal of operational amplifier 96 by means of a variable resistor 114, a capacitor 116 being connected between this output terminal and ground as shown.

The emitter of the transistor 112 is series connected with a resistor 118 of small value and for a purpose to be explained later and the actuating coil or coils 120 of the trailer brakes. Thus, when the transistor 112 is in conductive state, current from the battery 56 flows through the braking coil 120. A light emitting diode 122, preferably of red color, is connected to the emitter and also to a resistor 124 which is grounded. Another diode 126 is connected between the upper end of the coil 120 and ground.

The circuitry thus far described is responsive to a swaying condition of the trailer and serves momentarily to apply the brakes to correct the sway. The operation is as follows. Assuming that no swaying condition exists, the sensor 26 will be stable with the mercury pools 50 resting in the lower most portions of the respective housing 48. The voltage levels at the input terminals of operational amplifiers 74 and 74a are unaffected, with a threshold of approximately four volts being applied to the non-inverting terminals 10 and 12 and twelve volts on the inverting terminals 9 and 13, respectively. The operational amplifiers are connected in comparator configurations which provides for the output voltage changing state as a function of the highest relative input voltage. If the inverting voltage is higher than the non-inverting, the output voltage for that operational amplifier will rise to the approximate level of the supply voltage, twelve volts. However, if the inverting input voltage is lower than the non-inverting voltage, the output voltage of the operational amplifier will drop to near ground potential or zero volts. It is this principal that is utilized in connection with detecting a true sway condition.

With approximately twelve volts present at pin 9 and approximately four volts at pin 10, the output of amplifier 74 will be near ground potential. This ground potential is connected through diode 82 to the non-inverting input terminal of amplifier 76. With essentially zero volts on this non-inverting terminal 3 and about four volts at the inverting terminal 2, the output terminal of amplifier 76 will also be approximately zero volts or ground.

The circuit 72 functions identically, the zero voltage outputs of the amplifiers 76 and 76a also appearing as zero volts at the junction of the two resistors 88 and 90. The diodes 82 and 82a are located to prevent discharge of the respective capacitor 84, 84a through the operational amplifiers 74, 74a.

The zero volts appearing on the line 92 is connected directly to the non-inverting terminal 3 of operational amplifier 94. The inverting pin 2 is connected to point A in the voltage divider to provide a threshold voltage of about eight volts. With zero volts on pin 3 and eight volts on pin 2, the output of amplifier 94 will be zero volts. This output is connected through the diodes and resistors 98, 100, 102 and 104 to pin 12 of operational amplifier 96. This operational amplifier is connected as a voltage follower. The voltage on pin 12 (non-inverting terminal) is zero, the same as appears at the output pin 1 of amplifier 94. Since the amplifier 96 is connected as a voltage follower, the output voltage appearing at pin 14 will follow that applied to the input pin 12. In this instance, the voltage at pin 14 will be zero. This results in no voltage being applied to the base of transistor 110 such that both transistors 110 and 112 are held in a non-conductive state. When in such state, no current is delivered to the braking coil 120.

When a sway condition develops, the sensor 26 will be rapidly shifted transversely of the vehicle this motion causing the mercury pools 50 to engage the respective contacts 52 in sequence with a time interval between engagements being determined by the rapidity of the sway excursion, or in other words, by the frequency of the oscillatory motion of the trailer. In the circuit these engagements are represented by closure of switches 30 and 32. Assuming that switch 32 is the first to close, this momentarily connects pin 9 of amplifier 74 to ground. Since ground potential is below the threshold potential applied to pin 10, the state of amplifier 74 is changed to produce a high output of twelve volts which is coupled to pin 3 of operational amplifier 76. However, the capacitor 84 is in discharged condition by reason of the shunt connected resistor 86 such that it now charges at a rate depending upon its capacity. Once the charge level on the capacitor 84 exceeds the threshold voltage on pin 2 of amplifier 76, this amplifier changes state to a high output of twelve volts.

Since the closure of switch 32 is only momentary, this means that the state of amplifier 74 is only momentarily changed from low to high. The capacitor 84 cannot discharge back through the amplifier 74 because of the diode 82; however, it does discharge through the resistor 86. Thus, the state of amplifier 76 will remain high at twelve volts output until the capacitor 84 discharges to a value below about four volts, the threshold voltage on pin 2. If the closure of switch 32 is not followed by closure of switch 30, a voltage of twelve volts will appear at the output of amplifier 76 which results in only six volts appearing on line 92. This six volts is inadequate to trigger operational amplifier 94. However, under a true sway condition, the switch 30 will be closed immediately following closure of switch 32, in other words, the trailer swings rapidly first to the left and then to the right, in which event the pin 13 of amplifier 74a is grounded. Capacitor 84a is then charged as just described and amplifier 76a changes state to a high output voltage. If the switch 30 closes before the capacitor 84 discharges to a level sufficiently low to return the state of amplifier 76 from high to low, there will thus appear simultaneously at the output pins of the two amplifiers 76 and 76a a total of twelve volts on the line 92.

As to the operational amplifier 94, a threshold voltage of eight volts is supplied to inverting pin 2. When the voltage on line 92 exceeds eight volts, for example goes to the twelve volts, amplifier 94 changes state providing twelve volts at its output pin 1. The two resistors 88 and 90 in combination with the operational amplifier 94 may be considered as a logic AND circuit which provides an output signal of twelve volts when like output signals of twelve volts appear at the output terminals of the two amplifiers 76 and 76a. When voltage on line 92 exceeds eight volts, capacitor 106 starts charging through resistor 100. By reason of the time constant of this resistor and capacitor, the voltage applied to pin 12 of amplifier 96 will correspondingly increase from a level of zero up to a maximum of twelve volts. Since amplifier 96 is connected as a voltage follower, the voltage appearing at the output pin 14 will correspondingly increase. This voltage is applied to the base of the transistor 110, the latter being normally non-conductive, via variable resistor 114, the setting of this resistor 114 determining the magnitude of the signal applied to this base. The Darlington pair 110, 112 is thus rendered conductive to a degree depending upon the current applied to the base of transistor 110, transistor 112 conducting between the collector and emitter in accordance therewith. This collector-emitter current passes through the current-sensing resistor 118 and the brake coil 120, the latter serving to actuate the trailer brakes. It should be mentioned at this point that the single coil 120 is representative of the coils of all of the brakes on the wheels of the trailer whether that be for a single wheel or two or more. The current passing through the coil or coils 120 thus actuates the brakes to a degree depending upon the current conducted by the transistor 112.

The presence of the capacitor 106 serves to provide gradual rather than sudden application of the brakes by reason of the charging time thereof.

To correct a sway condition, the brakes are applied only momentarily. The period of brake actuation corresponds to the time constants of the two capacitor-resistor networks 84, 86 and 84a, 86a. Once these capacitors discharge through their respective resistors 86, 86a to a level below eight volts on line 92, the state of operational amplifier 94 switches to a low condition whereupon the output signal at pin 1 becomes essentially zero. Capacitor 106 now begins to discharge through resistor 224, the output voltage of operational amplifier 96 on pin 14 following this voltage excursion until transistor 110 is cutoff. Both transistors 110 and 112 now become non-conductive thereby deenergizing the brake coil or coils 120. Thus the period of brake application to correct the sway condition is determined by the time constant of the capacitor-resistor network in the two signal-generating circuits 70 and 72 and capacitor 106 and resistor 224.

With respect to the sway control circuitry thus described, the signal generating circuits 70 and 72 in combination with the logic AND circuit 88, 90, 94 form a frequency discriminating circuit as to the frequency of closure of switches 30 and 32.

As stated earlier, resistor 118 is a current-sensing resistor. This resistor 118 serves as a part of an overload protection circuit which includes the two operational amplifiers 128 and 130. In a working embodiment of this invention, resistor 118 is 0.06 ohms. Therefore, under normal conditions of operation, the voltage across resistor 118 will be very near to ground potential, the normal resistance of the brake coil 120 being approximately one ohm.

Under these normal conditions, inverting pin 6 of amplifier 128 will be higher in voltage than pin 5 by virtue of the two diodes 132 and 134 in the circuit of pin 6 and only one diode 136 in the circuit of pin 5. The extra diode 132, for example, renders the voltage on pin 6 about 0.6 volts higher than the voltage on pin 5. With pin 6 higher in voltage than pin 5, the output voltage of amplifier 128 will be near ground or zero volts. This zero voltage is coupled to inverting pin 9 of amplifier 130. Connected to pin 10 of amplifier 130 are two resistors 138 and 140. Resistor 138 is connected to the four volt threshold source of point B in the power supply circuit. Resistor 140 is connected to the output pin 8 of amplifier 130 for establishing a feedback path from pin 8 to pin 10. This circuit configuration formed by resistors 138 and 140 with the amplifier 130 is that of a comparitor with hystersis. Resistors 138 and 140 provide bias for the non-inverting pin 10 which establishes the turn-on and turn-off voltage of amplifier 130 under a short circuit or overload condition of braking coil 120. In the event the trailer brakes are not overloaded, resistor 138 establishes a reference voltage from the twelve volt source which keeps non-inverting pin 10 at a higher voltage than that of inverting pin 9, the voltage at pin 8 will rise to twelve volts. Diode 142 has its cathode connected to pin 8 of amplifer 130 and its anode 142 to pin 12 of the amplifier 96. The twelve volts appearing on pin 8 will thus be blocked and will not be conducted to amplifier 96. The sway control circuitry will thus operate normally.

However, if a short circuit in the braking coil 120 or in the circuit thereof should develop, the current through sensing resistor 118 will increase appreciably and produce thereover a sizable voltage drop. At a current of approximately 10 amperes, the voltage drop will be sufficient to raise the voltage on pin 5 higher than that on pin 6 of amplifier 128. This causes amplifier 128 to change state at which the voltage shifts from zero to twelve. The twelve volts appearing on pin 7 of amplifier 128 is applied to capacitor 144 which charges toward this twelve volt level. This capacitor 144 is also connected directly to pin 9 of amplifier 130. Therefore, the voltage on capacitor 144 will determine the voltage on pin 9 of amplifier 130. When capacitor 144 charges to a potential that is higher than the reference voltage set by resistors 138 and 140 at pin 10 of amplifier 130, the latter will change state dropping the output voltage from twelve to zero volts. This effectively grounds pin 12 of amplifier 96 through diode 142. With pin 12 at zero volts, the output pin 14 will also be zero volts and the transistors 110 and 112 will be rendered non-conductive and no current will flow through the braking coil 120. During a short circuit or overload condition in the circuit of the braking coil 120 the output signal of amplifier 130 will remain low and the sway control circuitry will be disabled until the overload condition is corrected. The discharge time of capacitor 144 is determined by the RC time constant of capacitor 144 and the parallel connected resistor 146.

Circuitry in the form of diode 216 and resistor 226 is provided to disable the brake-applying circuitry when the towing vehicle provided with an automatic transmission is shifted to reverse. A normally open switch 217 is closed by shifting into reverse to energize back-up lights 219. This back-up indicator switch 217 is connected to diode 216 to apply high voltage (+12 v.) to pin 9 of amplifier 130. This results in pin 8 going to zero thereby resulting in the Darlington transistor pair 110, 112 being cut-off. The trailer brakes thus cannot be energized while backing up.

The trailer brake control circuitry is generally indicated by the numeral 148. This circuit includes a PNP transistor 150 having a capacitor 152 connected between the emitter and collector thereof. Twelve volt supply voltage is coupled to the emitter by means of a variable resistor 154 and another resistor 156. The brake light switch 158 already present on the automobile is series connected between the positive terminal of the battery 56 and the base of the transistor 150 via a biasing resistor 160 and a diode 162. With the brake switch 158 open, and this is the switch normally closed by depression of the brake pedal in the automobile, the transistor 150 normally conducts, and in this condition, the capacitor 152 is shorted to ground. However, when the brake pedal is depressed, the switch 158 is closed thereby applying positive bias to the base of the transistor 150 rendering the latter non-conductive and thereby placing capacitor 152 in a charging circuit which includes resistors 154 and 156. The line 182 connects the high voltage side of capacitor 152 via resistor 224 to resistor 104. As the charge on capacitor 152 builds from zero to twelve volts, a corresponding signal is applied to pin 12 of amplifier 96. As previously explained, the voltage follower 96 and the Darlington pair amplifier 110, 112 are activated thus applying braking current to the coil 120. The time constant of capacitor 152 and its two resistors 154 and 156 are so selected as to apply the brakes gradually rather than suddenly, thereby providing for smooth brake application. The resistor 154 is adjustable to provide the desired graduated delay to suit driver preference.

The brake control circuit 148 also includes a circuit by means of which the trailer brakes may be further manually applied but with a controllable degree of brake application. The circuitry for accomplishing this includes a hand operated switch generally denoted by the numeral 166. The switch includes two cantilever spring contacts 168 and 170 which are normally open and a spongy plastic resistance pad 172 mounted against a stationary, rigid backing. The pad 172 is composed of a suitably open textured, soft spongy plastic or a rubber material more commonly referred to as foam plastic or rubber. The pad is impregnated with electrically conductive, powdered graphite which may be incorporated into the body of the pad during the formation thereof. For example, the powdered graphite may be mixed with the plastic chemicals which react to provide the foamed structure, such that the graphite permeates rather homogeneously the entire thickness of the pad.

By moving the switch contact 168 toward and into engagement with the contact 170 and the two still further into forceful contact with the pad 172, a circuit is established between these two contacts and the pad 172. In its expanded condition, the pad 172 exhibits maximum resistance, but as it is progressively compressed by forceful engagement of the switch contacts 168, 170, the resistance thereof correspondingly lowers. The contact 168 is connected to the positive terminal of the battery 56. The resistance pad 172 is connected to the upper end of a voltage divider composed of resistors 174 and 176. The base of a transistor 178 is connected to the juncture of these two resistors 174 and 176 and is normally biased to be non-conductive when the switch 166 is open. Upon closure of the switch 166 by moving the engaged contacts 168 and 170 into compressive engagement with the pad 172, potential is applied to the upper end of the resistor 174 depending upon the resistance at the moment of the pad 172. This potential is applied to the base of transistor 178 by means of the voltage divider 174, 176 which renders it conductive. The collector thus approaches ground which essentially grounds the base of transistor 150. Transistor 150 is rendered conductive thereby maintaining capacitor 152 discharged. However, the same voltage appearing at the top of resistor 174 is coupled via diode 180 and line 182 to the resistor 104 and to the pin 12 of the voltage follower 96. Since the corresponding voltage appears at the pin 14, the Darlington pair amplifier 110, 112 will be activated to energize the braking coil 120. The degree of energization depends upon the resistance of the pad 172 at the particular moment. By applying maximum force on the contacts 168, 170 against the pad 172, the resistance of the latter becomes essentially zero in which event maximum supply voltage is applied to the upper end of resistor 174. This results in maximum potential being applied to the voltage follower 96 and corresponding energization of the braking coil 120.

The circuitry of FIG. 2, with the exception of the sensor 26 is installed in a single housing or package which is mounted in the automobile to be conveniently accessible to the driver. The switch 166 is so positioned on the housing that the driver may conveniently depress it by hand thus making available to the driver the options of applying the trailer brakes concurrently with the automobile brakes by stepping on the brake peddle and closing switch 158 or alternatively to apply the trailer brakes alone by depressing the switch 166.

In view of the fact that portions of the brake and sway control circuitry are common, an economy is at once realized in the number of components required and further the total size of the unit. A functional feature also resides in this combination circuit in that applying the brakes by means of the switch 166 or switch 158 to a degree less than full force will still make available sway control. For example, if the switch 166 is operated to apply the trailer brakes to half intensity, should a sway condition occur, a sway control signal of full intensity will be momentarily generated which will produce momentary full application, as previously set by resistor 114 during the adjustment phase of installation, to correct for the sway. The moment the sway signal ceases, the half braking force will still be applied.

Circuitry for controlling the application of power to the sway control circuitry is included within the dashed line box 184.

Upon closure of the ignition switch 58, power from the battery is not directly applied to the signal-generating circuits 70 and 72, but is connected through the circuit 184 which contains a silicon controlled rectifier 186. Connected to the anode is a switch 188 which leads to the supply voltage at the cathode of diode 60 and connected to the gate is a capacitor 190. Upon closure of the ignition switch 58, capacitor 190 acts as a momentary short and passes a pulse of voltage to the gate of rectifier 186. This pulse gates the rectifier to a conductive state and allows the supply voltage to be conducted through the normally closed switch 188 and the rectifier 186 to the light emitting diode 192. From the anode of diode 192, the supply voltage is coupled to pin 4 of operational amplifier 74, or in other words, to the four operational amplifiers in the signal-generating circuits 70 and 72. Light emitting diode 192 is preferably green and will indicate that power has been applied to the sway control circuitry and that the sway control circuitry is the "ready" state.

The sway control circuitry may be turned "off" manually by opening the switch 188 for removing the anode voltage from the rectifier 186. This serves to disconnect the source of supply voltage from the operational amplifiers in the signal-generating circuits 70 and 72. Switch 188 is spring biased normally closed, only momentary opening thereof being necessary in order to remove the supply voltage from the sway control circuitry.

In order manually to reapply supply voltage to the operational amplifiers, the switch 198 is closed momentarily. This results in the supply voltage being applied to the gate of rectifier 186 via diode 200 which renders rectifier 186 conductive. Supply voltage once again will be applied to line 196.

A system's test may be performed on the sway control circuitry by closing switch 198 for approximately ten seconds. Capacitor 202 will now charge through resistors 204 and 206 toward the level of the supply voltage. Connected to capacitor 202 are the anodes of two diodes 208 and 210. These diodes in turn are connected to pins 3 and 5 of operational amplifiers 76 and 76a. When capacitor 202 charges to approximately 5 volts, pins 3 and 5 of amplifiers 76 and 76a will become higher in voltage than their respective inverting pins 2 and 4. At this point the output voltages of amplifiers 76 and 76a will both rise to approximately the level of the supply voltage, which in the working embodiment is twelve volts. With pin 1 of amplifier 76 and pin 7 of amplifier 76a at twelve volts, the junction of resistors 88 and 90 will become twelve volts, the same as if the circuitry were operating under a true sway condition. When the switch 198 is opened, capacitor 202 will discharge through resistor 212 and diode 200. The input pins 3 and 5 of amplifiers 76 and 76a will then return to the state of being ready to respond to a swaying condition of the trailer.

In the following is given the components and values of a working embodiment of this invention as exemplary only, it being understood by persons skilled in the art that these may be altered without varying from the spirit and scope of this invention.

| | |
|---|---|
| Transistor 178 - National Semiconductor | NPN MPSA20 |
| Transistor 110 - PPC Corp. | NPN 2N5490 |
| Transistor 112 - PPC Corp. | NPN 2N3055 |
| Transistor 150 - National Semiconductor | PNP MPSA70 |
| Diode 162 - Horizon Semiconductor | 1N67A |
| Diodes 60, 126 - General Instrument | 1N4005 |
| Diodes 82, 82a, 208, 210, 98, 102, 142, 214, 132, 180, 134, 136, 216 - Fairchild Semiconductor | 1N914 |
| Resistor 118 | 0.06 ohm |
| Resistor 218 | 100 ohm |
| Resistors 124, 194 | 470 ohm |
| Resistors 78, 78a, 222, 160, 62, 64, 66, 206 | 1000 ohm |
| Resistors 220, 174, 176 | 56,000 ohm |
| Resistors 88, 90, 104 | 10,000 ohm |

-continued

| | |
|---|---|
| Resistors 100, 138, 156, 212, 226 | 100,000 ohm |
| Resistors 146, 224, 86, 86a | 1 megohm |
| Resistor 204 | 470,000 ohm |
| Resistor 140 | 18,000 ohm |
| Resistor 114, variable | 5,000 ohm |
| Resistor 154, variable | 500,000 ohm |
| Capacitors 152, 202 | 10 microfarad |
| Capacitor 190 | 0.1 microfarad |
| Capacitors 86, 86a, 106, 144, 116 | 1.0 microfarad |
| Capacitor 68 | 200 microfarad |
| Operational amplifiers 74, 76, 74a, 76a, 94, 96, 128, 130 | Texas Instruments LM2902 |
| Pad 172 | Velostat Foam Type 1901 3-M Brand $\frac{1}{4}'' \times \frac{3}{4}'' \times \frac{1}{8}''$ |

While there have been described above the principles of this invention in connection with specific apparatus, it is to be clearly understood that this description is made only by way of example and not as a limitation to the scope of the invention.

What is claimed is:

1. Apparatus for selectively applying the brakes of a trailer while being towed by a towing vehicle comprising:

first means for sensing lateral oscillatory motion of said trailer and for generating separate right and left acceleration signals in response to right and left acceleration, respectively of said trailer, second means for producing a sway-inhibiting signal in response to both of said right and left acceleration signals which successively occur in a time shorter than a predetermined period of time, third means for producing a brake control signal in response to said sway-inhibiting signal, said second means including two signal-generating circuits responsive to said right and left accelerating signals, respectively, to produce two logic signals, respectively, means for combining said logic signals to produce a single sway-inhibiting signal only when said logic signals occur simultaneously within said period of time said logic signals being in the form of unidirectional voltages, said combining means being responsive to simultaneous occurrence thereof to produce said sway-inhibiting signal only when the combined unidirectional voltages exceed a predetermined magnitude, said combining means being a logic AND circuit having two input circuits and an output circuit, said two input circuits being connected to said two signal-generating circuits, respectively, to receive the logic signals thereof, each signal-generating circuit including a signal-holding circuit which maintains said logic signal for a predetermined time interval and terminates said logic signal after such time interval, each said signal-holding circuit including a charging capacitor and resistor in parallel, each signal-generating circuit having input and output circuits, said first means including two switch devices individually coupled to the input circuits, respectively, of said signal-generating circuits and being actuable in response to lateral motion of said trailer, said output circuits, respectively, being connected to the input circuits of said logic AND circuit, each of said signal-generating circuits including two series coupled operational amplifiers, a source of threshold potential being connected to one input terminal of each amplifier, the other input terminal of the first amplifier being connected to one of said switch devices and the other input terminal of the second amplifier being coupled to the output terminal of the first amplifier, said capacitor having one side connected to said other input terminal of said second amplifier, and said logic AND circuit including a resistance connected between the output terminals of the second amplifiers of the two signal-generating circuits with a tap on said resistance serving as a part of said logic AND circuit.

2. The apparatus of claim 1 wherein said switch devices include two mercury switches set at an angle to each other and to the horizontal and in such position as to be normally "off".

3. The apparatus of claim 1 wherein said combining means is said logic AND circuit and includes an operational amplifier having a source of threshold voltage connected to one input terminal and said tap connected to the other input terminal, said amplifier changing state by the simultaneous occurrence of said logic signal voltages which exceed said threshold voltage to produce at the output terminal thereof said sway-inhibiting signal.

4. The apparatus of claim 3 wherein said third means includes circuit means connected to the output terminal of said operational amplifier for shaping said brake control signal such that is progressively increases in magnitude at a predetermined rate whereby the brakes of said trailer are progressively applied accordingly.

5. The apparatus of claim 4 wherein said signal shaping means is a capacitor and resistor in parallel with said capacitor having one side connected to said output terminal, and said third means further includes means for amplifying said brake control signal, and means manually operable for varying the amplitude of said control signal.

6. The apparatus of claim 5 wherein said amplifying means includes an operational amplifier connected as a voltage follower coupled to said one side of said capacitor, the output terminal of said follower being coupled to the input circuit of a Darlington pair amplifier, said manually operable means including a variable resistor connected between said Darlington pair amplifier and said follower output terminal.

7. The apparatus of claim 6 including a diode and resistor series connected between the output terminal of said logic AND operational amplifier and said one side of said capacitor, said diode being in such polarity as to block discharge of said capacitor once charged.

8. The apparatus of claim 6 including a trailer braking circuit, said Darlington pair amplifier having an output circuit connected to said trailer braking circuit for applying a brake control signal thereto, and means for disabling production of said brake conrol signal in response to an overload in the trailer brake circuit.

9. The apparatus of claim 1 including in each signal-generating circuit a diode in series between the output terminal of said first amplifier and the other input terminal of said second amplifier.

10. Apparatus for selectively applying the brakes of a trailer while being towed by a towing vehicle comprising:

first means for sensing lateral oscillatory motion of said trailer and for generating separate right and left acceleration signals in response to right and left acceleration, respectively, of said trailer, second means for producing a sway-inhibiting signal in response to both of said right and left acceleration signals which successively occur in a time shorter than a predetermined period of time, third means for producing a brake control signal in response to said sway-inhibiting signal, said second means including two signal-generating circuits responsive to said right and left acceleration signals, respectively, to produce two logic signals, respectively, means for combining said logic signals to produce a single sway-inhibiting signal only when said logic signals occur simultaneously within said predetermined period of time, said logic signals being in the form of unidirectional voltages, said combining means being responsive to simultaneous occurrence thereof to produce said sway-inhibiting signal only when the combined unidirectional voltages exceed a predetermined magnitude, said third means including circuit means for shaping said brake control signal such that it progressively increases in magnitude at a predetermined rate whereby the brakes of said trailer are progressively applied accordingly.

11. Apparatus for inhibiting sway of a trailer towed by a towing vehicle, said trailer having brakes actuable by an electrical braking circuit, comprising:

sensing means responsive to oscillatory sway having a period of oscillation that occurs within a predetermined period of time for producing a sway-inhibiting signal, signal means responsive to said signal for producing a brake control signal, said brake control signal means having an output circuit connected to said braking circuit for applying said brake control signal thereto to actuate said brakes, said brake control signal means including a current amplifier for amplifying said brake control signal and a current-sensing circuit which produces an overload signal in response to overload current being drawn by said braking circuit for producing a bias which disables said current amplifier.

12. The apparatus of claim 11 wherein said preventing means further includes two series connected operational amplifiers which are activated by said overload signal to produce an amplified overload signal, said current amplifier having an input circuit coupled to said operational amplifiers and responsive to said amplified overload signal to cease its amplifying function.

13. The apparatus of claim 12 wherein said current amplifier further includes an operational amplifier connected as a voltage follower having input and output circuits, said input circuit being connected to said sensing means to receive said sway-inhibiting signal, a Darlington pair amplifier having input and output circuits, the last-mentioned output circuit being the same as said output circuit of said brake control signal means, a variable resistor connecting the output circuit of said follower to the input circuit of said Darlington pair amplifier, the operational amplifiers of said preventing means having an output circuit connected to said follower input circuit for applying said amplified overload signal thereto.

14. The apparatus of claim 13 wherein said current-sensing circuit is a resistor series connected between the output circuit of said Darlington pair amplifier and said braking circuit, the first of said two operational amplifiers having its two input terminals coupled to the opposite ends, respectively, of said resistor whereby said first amplifier changes state with overload voltage appearing across said resistor, the output terminal of said first amplifier being diode coupled to one of two input terminals of the second amplifier, a capacitor connected between the last-mentioned one input terminal and a source of reference voltage, a resistor in parallel with said capacitor, the other input terminal of said second amplifier being resistance coupled to the output terminal thereof, a source of threshold voltage being connected to the last-mentioned output terminal, this latter output terminal being the output circuit of said preventing means and is diode connected to said follower input circuit, said amplified overload signal appearing at the output terminal of said second amplifier being coupled to said follower input circuit thereby to bias said Darlington pair amplifier to a non-conductive state.

15. Apparatus for selectively applying the brakes of a trailer being towed by a towing vehicle, said brakes including a braking circuit and said towing vehicle carrying manually operable brake-applying means, said apparatus comprising sensing means responsive to oscillatory sway of said trailer having a period of oscillation that occurs within a predetermined period of time for producing a sway-inhibiting signal, circuit means responsive to said sway-inhibiting signal for producing a first brake-actuating signal of predetermined magnitude, said circuit means having an output circuit connected to said braking circuit for applying said first brake-actuating signal thereto to actuate said brakes, manually operable circuit means responsive to operation of said manually operable brake-applying means for generating a brake-applying signal of given magnitude, said circuit means also being responsive to said brake-applying signal of given magnitude to produce a corresponding second brake-actuating signal of less than said predetermined magnitude, said first, second, sway-inhibiting and brake-applying signals being unidirectional potentials, said manually operable circuit means including manually controlled means for varying the magnitude of said brake-applying signal within a range which exceeds said given magnitude, said manually operable circuit means and said manually controlled means including two brake-operating switches on the towing vehicle, one of said switches being cooperatively associated with the towing vehicle brake pedal to initiate production of said brake-applying signal when said pedal is operated and the other of said switches being manually operable to also initiate production of said brake-applying signal, a source of unidirectional supply voltage, each of said switches being series connected between said source and said circuit means, said other switch having a variable resistor in series and cooperatively associated therewith to vary in resistance in relation to manual actuating force applied to said other switch thereby determining the magnitude of said brake-applying signal applied to said circuit means, said circuit means responding to either or both of said sway-inhibiting and brake-applying signals to produce a brake-actuating signal of a magnitude corresponding to the greater of both signals when they occur simultaneously or to one signal occurring independently whereby said trailer brakes may be applied either fully or partially depending upon the magnitudes of said sway-inhibiting and brake-applying signals, said manually operable circuit means further including a first transistor and a charging capacitor connected between the emitter and collector thereof, means for biasing said transistor to a normally conductive state when said one switch is not operated, a resistance series connected between one of said emitter and collector and said source thereby establishing a charging path to said capacitor, first circuit means connected to the base of said transistor for rendering the latter non-conductive in response to actuation of said one switch thereby establishing a charging current to said capacitor, and a signal-carrying circuit connecting said capacitor to said circuit means for applying said brake-applying signal thereto.

16. The apparatus of claim 15 wherein said manually operable circuit means includes a second transistor having one of its collector and emitter coupled to the base of said first transistor, second circuit means biasing said second transistor to a nonconductive state, said other switch and its variable resistor being series connected between said source and said second transistor to render the latter conductive when said other switch is actuated, said signal-carrying circuit connecting said other switch and its resistor to said circuit means for applying said brake-applying signal thereto, and third circuit means for rendering said first transistor conductive when said second transistor is rendered non-conductive.

17. The apparatus of claim 16 wherein the first-mentioned biasing means includes a diode and resistance series connected between the base and collector of said first transistor, said source being connected across said collector and emitter thereof and one side of said source being connected to the last-mentioned resistance, said diode being series connected between the collector and base of said second and first transistors, respectively, said second-mentioned biasing circuit being a voltage-dividing resistance having a tap thereon connected to the base of the second transistor, a diode series connected to said voltage-dividing resistance and these in turn being connected across said source, said signal-carrying circuit being connected to the last-mentioned diode on the side opposite said voltage-dividing resistance.

18. Apparatus for selectively applying the brakes of a trailer being towed by a towing vehicle, said brakes including a braking circuit and said towing vehicle carrying manually operable brake-applying means, said apparatus comprising sensing means responsive to oscillatory sway of said trailer having a period of oscillation that occurs within a predetermined period of time for producing a sway-inhibiting signal, circuit means responsive to said sway-inhibiting signal for producing a first brake-actuating signal of predetermined magnitude, said circuit means having an output circuit connected to said braking circuit for applying said first brake-actuating signal thereto to actuate said brakes, manually operable circuit means responsive to operation of said manually operable brake-applying means for generating a brake-applying signal, said sensing means having an output circuit in which appears said sway-inhibiting signal, said circuit means having an input circuit connected to said output circuit of said sensing means, said manually operable circuit means being connected to said input circuit of said circuit means whereby both said sway-inhibiting and brake-applying signals may be simultaneously or individually applied thereto, said circuit means further including a voltage-follower responsive to said sway-inhibiting and brake-applying signals to reproduce the same signals, and a current amplifier coupled to said voltage-follower to produce said brake control signal.

19. The apparatus of claim 18 including second means for producing a second brake-applying signal and connected to said input circuit, said first-mentioned brake-applying signal developing to a uniform state each time it is produced and said second brake-applying signal being of a state that is manually variable, said circuit means responding to both first-mentioned and second brake-applying signals to produce a brake control signal of corresponding state whereby said trailer brakes may be applied either fully or partially depending upon the states of said first and second signals.

20. The apparatus of claim 19 wherein said voltage-follower is an operational amplifier connected in a voltage follower configuration, said input circuit being connected to the input terminal of said voltage-follower operational amplifier, said input circuit including two diodes and two resistors series connected with one resistor between the diodes and the other resistor connected to said input terminal, the polarity of said diodes being connected to conduct current in one direction only, said first means and second means being connected to the juncture of the other diode and the other resistor, a time constant circuit having two terminals with one terminal being connected to the juncture between said one resistor and said other diode, and said time constant circuit including a capacitor and resistor in parallel connected between said terminals.

21. The apparatus of claim 20 wherein said current amplifier is a Darlington pair having an input circuit connected to the output terminal of said operational amplifier, a variable resistor being in circuit between said operational amplifier and said Darlington pair.

22. An electric brake control apparatus for disabling the brakes of a towed vehicle when the towing vehicle is shifted into reverse comprising:
(a) means for applying the brakes of the towed vehicle from the towing vehicle,
(b) means for disabling the applying means when said towing vehicle is shifted into reverse, said applying means including first circuitry for producing a brake-applying signal when the brakes of the towed vehicle are applied, said first circuitry including an amplifier; said disabling means including second circuitry which is coupled to said amplifier for selectively disabling the latter, said second circuitry including switch means responsive to shifting said towing vehicle into reverse and biasing means which is responsive to activation of said switch means to disable said amplifier.

23. The apparatus of claim 22 wherein said switch and biasing means includes a back-up switch having a source of potential connected thereto and an operational amplifier having two input terminals, said switch being connected to one input terminal of said operational amplifier, the other input terminal having a source of reference potential applied thereto, the output terminal of said operational amplifier being connected to the first-mentioned amplifier, said operational amplifier producing a bias which disables said first-mentioned amplifier when said switch is closed.

* * * * *